US011623363B2

(12) United States Patent
Adkins

(10) Patent No.: US 11,623,363 B2
(45) Date of Patent: Apr. 11, 2023

(54) APPARATUS FOR SUPPORTING A WORKPIECE

(71) Applicant: Yeti Tool Ltd, North Somerset (GB)

(72) Inventor: Ian Adkins, North Somerset (GB)

(73) Assignee: Yeti Tool Ltd, Clevedon (GB)

( * ) Notice: Subject to any disclaimer, the term of this patent is extended or adjusted under 35 U.S.C. 154(b) by 302 days.

(21) Appl. No.: 17/057,309

(22) PCT Filed: May 16, 2019

(86) PCT No.: PCT/GB2019/051355
§ 371 (c)(1),
(2) Date: Nov. 20, 2020

(87) PCT Pub. No.: WO2019/224523
PCT Pub. Date: Nov. 28, 2019

(65) Prior Publication Data
US 2021/0252735 A1   Aug. 19, 2021

(30) Foreign Application Priority Data

May 23, 2018 (GB) ..................... 1808469

(51) Int. Cl.
*B27C 5/06* (2006.01)
*B23Q 1/76* (2006.01)
(Continued)

(52) U.S. Cl.
CPC ............... *B27C 5/06* (2013.01); *B23Q 1/766* (2013.01); *B23Q 3/065* (2013.01); *B23Q 9/0014* (2013.01);
(Continued)

(58) Field of Classification Search
CPC ........ B21D 43/08; B21D 43/09; B23Q 3/002; B23Q 3/069; B23Q 37/002; B65H 5/062; Y10T 83/6579; Y10T 83/8857
See application file for complete search history.

(56) References Cited

U.S. PATENT DOCUMENTS 4,215,731 A   8/1980   Maynard
4,610,582 A   9/1986   Amos
(Continued)

FOREIGN PATENT DOCUMENTS

DE   102013008368 A1   11/2013
EP       0096470 A2    12/1983
(Continued)

*Primary Examiner* — Tyrone V Hall, Jr.
(74) *Attorney, Agent, or Firm* — Lightbulb IP, LLC

(57) ABSTRACT

Apparatus (101) for supporting a workpiece (201), comprising a frame structure (102) for holding a workpiece (201), a base element (103) for supporting the frame structure (102), and a tool support element (110) for holding a tool. The frame structure (102) comprises lower and upper frame elements (107, 108) between which a workpiece (201) is receivable, and the upper frame element (108) is movable with respect to the lower frame element (107) in a Z-axis direction (106), for clamping a workpiece (102) therebetween. The tool support element (110) is movable with respect to the upper frame element (108) in an X-axis direction (104). The frame structure (102) is movable with respect to the base element (103), and with respect to a workpiece held between the lower and upper frame elements (107, 108), in a Y-axis direction (105). A CNC machine comprising the apparatus (101).

20 Claims, 6 Drawing Sheets

(51) Int. Cl.
  *B23Q 3/06* (2006.01)
  *B23Q 9/00* (2006.01)
  *B23Q 9/02* (2006.01)
  *B25H 1/06* (2006.01)
  *B25H 1/10* (2006.01)
  *B25H 1/14* (2006.01)

(52) U.S. Cl.
  CPC ............... *B23Q 9/02* (2013.01); *B25H 1/06* (2013.01); *B25H 1/10* (2013.01); *B25H 1/14* (2013.01); *B23Q 2240/002* (2013.01)

(56) References Cited

U.S. PATENT DOCUMENTS 5,524,328 A * 6/1996 Hardesty ............... B23Q 3/16
  409/197
2007/0206997 A1 9/2007 Onsrud
2012/0103472 A1 5/2012 Lachance

FOREIGN PATENT DOCUMENTS

EP 3050657 A2 8/2016
EP 3281755 A1 2/2018

* cited by examiner

APPARATUS FOR SUPPORTING A WORKPIECE

FIELD OF THE INVENTION

The present invention relates to apparatus for supporting a workpiece, in particular to work holding apparatus for use in CNC routing.

BACKGROUND OF THE INVENTION

Computer numerical control (CNC) is the automation of machine tools using a computing device that executes pre-programmed sequences of machine control commands. A type of CNC machine is a CNC router for cutting, carving or etching a material, for example wood, composite, metal, plastic, vinyl or rigid foam, which is supported on a cutting bed. The CNC router is controlled by a computer, with computer software and controller electronics being used to drive the tool bit along tool paths within a co-ordinate system, with improved precision, accuracy and speed when compared to manual operation. The maximum size of the workpiece that can be machined using a CNC router is commonly determined by the extent of the cutting range and the size of the cutting bed.

A known type of cutting bed is a vacuum table top, which is designed to hold flat sheet material securely in place under the action of suction applied from the underside thereof. Advantages of this arrangement include the workpiece being held in place with the same amount of force across the entire workpiece, and the relatively quick speed of securing and releasing of the workpiece. Disadvantages of this arrangement include the cost of buying, running and maintaining the suction pump, and the weight and volume of the vacuum infrastructure. A spoilboard, through which the suction is effective, may be placed between the vacuum table top and the flat sheet material.

Another known type of cutting bed is a T-slot table, which allows work holding devices such as clamps to be affixed to slots in the surface thereof. Advantages of this arrangement include cost-effectiveness and versatility. Disadvantages of this arrangement include the potential inability to securely hold down the entirety of a flat sheet of material, or to properly hold flat a slightly warped sheet of material, and the working holding devices obstructing the area of the workpiece that can be accessed by the tool bit.

It is an object of the invention to provide improved apparatus for supporting a workpiece.

SUMMARY OF THE INVENTION

According to a first aspect there is provided apparatus for supporting a workpiece, comprising: a frame structure for holding a workpiece, the frame structure having a length dimension in a first direction (X-axis), a width dimension in a second direction (Y-axis) and a depth dimension in a third direction (Z-axis), and a base element for supporting the frame structure; the frame structure movable with respect to the base element in the second direction (Y-axis), the frame structure comprising a lower frame element and an upper frame element, between which a workpiece is receivable, the upper frame element movable with respect to the lower frame element in the third direction (Z-axis), to adjust the distance between the upper frame element and the lower frame element, for clamping a workpiece therebetween.

Advantageously, the frame structure is movable with respect to a workpiece held between the lower frame element and the upper frame element in the second direction (Y-axis).

The frame structure may be elongate, having a length dimension in the first direction (X-axis) that is greater than the width dimension in the second direction (Y-axis) and that is greater than the depth dimension in the third direction (Z-axis).

The apparatus may further comprise a tool support element for holding a tool, the tool support element movable with respect to the upper frame element in the first direction (X-axis).

Beneficially, when the apparatus is set up for use, the tool support element is configured to travel along the frame structure in the first direction (X-axis), the frame structure is configured to travel along the base element in the second direction (Y-axis), and the upper frame element of the frame structure can be opened and closed relative to the lower frame element in the third direction (Z-axis).

In use, the frame structure travels along the workpiece to position a tool supported by the tool support element in the second (Y-axis) direction and the tool support element travels along the frame structure to position a tool supported by the tool support element in the first (X-axis) direction. The tool support element allows the position of a tool supported by the tool support element to be adjusted in the third (Z-axis) direction.

Thus, the arrangement allows positioning of a tool supported by the tool support element in the X, Y and Z axis when a workpiece is held by the frame structure, and allows the degree of clamping of the workpiece between the upper frame element and the lower frame element of the frame structure to be adjusted.

Beneficially, the apparatus can hold a planar workpiece with a strip of the planar workpiece being restrained within the frame structure at any one time; the frame structure being configured to travel along the workpiece received between the upper frame element and the lower frame element overcomes the requirement associated with prior art arrangements to securely hold the entire planar workpiece flat during machining.

The lower frame element may define a recess therein, and the base element may be receivable between the lower frame element and the upper frame element and within the recess. The base element may be removably receivable between the lower frame element and the upper frame element and within the recess. In an example, the base element may be exchangeable with another base element that is also utilisable with the frame structure.

The base element may comprise a pair of guide rails, the pair of guide rails extending in said second direction (Y-axis) and spaced apart in said first direction (X-axis), in a substantially parallel arrangement, the frame structure slidable along the pair of guide rails.

The upper frame element may comprise a pair of upper guide bars, the pair of upper guide bars extending in the first direction (X-axis) and spaced apart in the second direction (Y-axis) and the pair of upper guide bars defining a window, the tool support element configured to support a tool at a position disposed, in the second direction (Y-axis), between the pair of upper guide bars for performing an operation on a surface of a workpiece held by the frame structure and accessible through the window. The lower frame element may comprise a lower guide bar extending in the first direction (X-axis) and disposed, in the second direction (Y-axis), between the pair of upper guide bars. Thus, a workpiece may be held by the frame structure with three contact regions being provided between the workpiece and the frame structure, first and second of the three contact regions being between the upper frame element and a first, upper surface of the workpiece and a third of the three contact regions being between the lower frame element and a second, lower surface of the workpiece.

The lower frame element may support a lower bearing arrangement comprising at least one bearing for contacting the lower surface of a workpiece received between the lower frame element and the upper frame element. The lower bearing arrangement can beneficially facilitate travel of the frame structure along a workpiece held between the lower frame element and the upper frame element. The at least one bearing may comprise one of: a roller, a wheel, a skid, a pad, an air bearing. The lower bearing arrangement may comprise a single bearing or a plurality of bearings.

The upper frame element may support an upper bearing arrangement comprising at least one bearing for contacting the upper surface of a workpiece received between the lower frame element and the upper frame element. The upper bearing arrangement can beneficially facilitate travel of the frame structure along a workpiece held between the lower frame element and the upper frame element. The at least one bearing may comprise one of: a roller, a wheel, a skid, a pad, an air bearing. The upper bearing arrangement may comprise a plurality of bearings.

The apparatus may further comprise a first base element support for supporting a first end of the base element and a second base element support for supporting a second end of the base element. One of the first and second ends of the base element may be securable in each of a plurality of different positions along one of the first and second base element supports, each of the plurality of different positions associated with a different angle of inclination of the base element when the first and second ends thereof are supported by the first and second base element supports. An end of the base element may be slidable between each of a plurality of different positions along the one of the first and second base element supports.

According to a second aspect there is provided a CNC machine comprising apparatus according to the first aspect. The CNC machine may be a CNC router.

Further particular and preferred aspects of the present invention are set out in the dependent claims.

BRIEF DESCRIPTION OF THE DRAWINGS

The present invention will now be more particularly described, with reference to the accompanying drawings, in which.

DESCRIPTION

Example embodiments are described below in sufficient detail to enable those of ordinary skill in the art to embody and implement the apparatus, systems and processes described herein. It is to be understood that embodiments can be provided in many alternate forms and the invention should not be construed as limited to the specific embodiments and examples set forth herein but by the scope of the appended claims.

Figure 1:
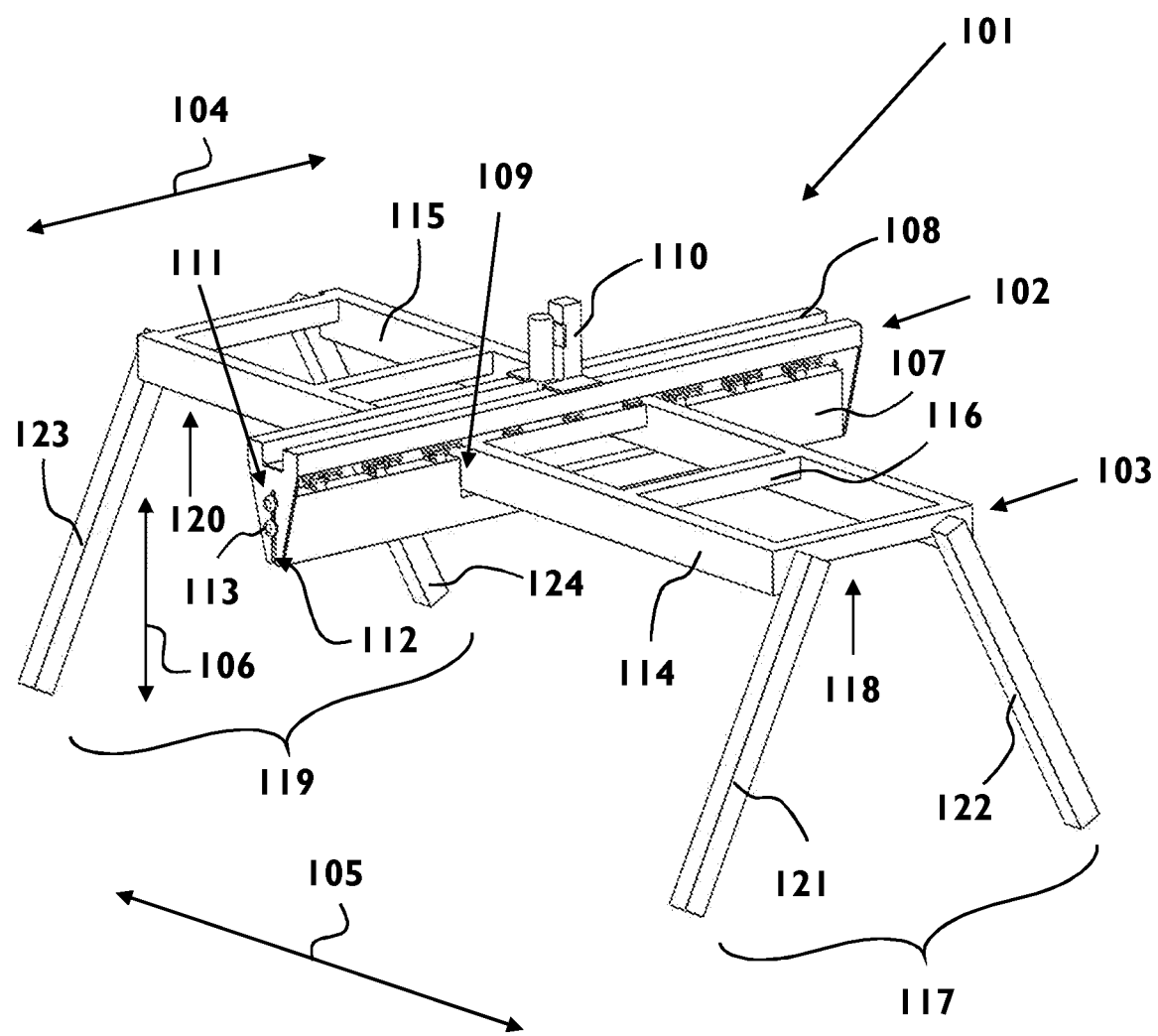
FIG. 1 shows apparatus for supporting a workpiece, and a first stand arrangement.

Apparatus 101 for supporting a workpiece is shown in FIG. 1. The apparatus 101 may be, or may be comprised by, a CNC machine, such as a CNC router.

Apparatus 101 comprises a frame structure 102, for holding a workpiece (not shown), and a base element 103, for supporting the frame structure 102.

The frame structure 102 has a length dimension that extends in a first direction 104, which will hereinafter also be referred to as an X-axis, a width dimension that extends in a second direction 105, which will hereinafter also be referred to as a Y-axis, and a depth dimension that extends in a third direction 106, which will hereinafter also be referred to as a Z-axis. Thus, the second direction 105 is perpendicular to the first direction 104 and the third direction 106 is perpendicular to the first direction 104 and to the second direction 105. The shown frame structure 102 is elongate, with the length dimension in the first direction 104 being greater than the width dimension in the second direction 105 and the depth dimension in the third direction 106.

The frame structure 102 is movable with respect to the base element 103 in the Y-axis direction 104.

The frame structure 102 comprises a lower frame element 107 and an upper frame element 108, between which a workpiece is receivable. The upper frame element 108 is movable with respect to the lower frame element 107 in the Z-axis direction 106, to adjust the distance between the upper frame element 108 and the lower frame element 107, for clamping a workpiece therebetween.

In the arrangement shown in FIG. 1, the frame structure 102 is positioned relative to the base element 103 such that the lower frame element 107 extends under the base element 103 and the upper frame element 108 extends over the base element 103. The lower frame element 107 defines a recess 109 therein, and the base element is receivable within the recess 109. The base element 103 is thus receivable between the lower frame element 107 and the upper frame element 108 and within the recess 109. In an example, the base element 103 is removably receivable between the lower frame element 107 and the upper frame element 108 and within the recess 109. In an example, the base element may be exchangeable with another base element that is also utilisable with the frame structure.

The frame structure 102 is locatable around the base element 103 such that the frame structure 102 and base element 103 together form a cruciform shape.

According to the shown arrangement, apparatus 101 also comprises a tool support element 110, for holding a tool (not shown), such as a router. The tool support element 110 is movable with respect to the upper frame element 108 in the Z-axis direction 106.

Any suitable arrangement may be utilised to enable the frame structure 102 to be moved with respect to the base element 103 in the first direction 104. According to the illustrated example, the frame structure 102 is slidably engageable with the base element 103.

Any suitable arrangement may be utilised to enable the upper frame element 108 to be moved relative to the lower frame element 107 in the third direction 106 to adjust the extent of separation between the upper frame element 108 and the lower frame element 107. Further any suitable arrangement may be utilised to enable the upper frame element 108 to be releasably locked relative to the lower frame element 107 at a particular extent of separation between the upper frame element 108 and the lower frame element 107. The same or different arrangements may be provided for achieving these functions.

In an example, the upper frame element 108 is slidably engaged with a positioning mechanism 111 that allows the size of a gap between the upper frame element 108 and the lower frame element 107 to be selectively varied and maintained. In this illustrated example, the positioning mechanism 111 comprises a slot, such as slot 112, formed in each end of the upper frame element 108 and at least one manually operable fixing, such as fixing 113, extending from each end of the lower frame element 107, each fixing arranged to extend through a respective slot and usable to releasably secure the upper frame element 108 relative to the lower frame element 107. When the frame structure 102 is oriented as shown, with the upper frame element 108 above the lower frame element 107, gravity will act on the upper frame element 108 to pull it towards the lower frame element 107. In an example, the upper frame element 108 is manually movable upwards and downwards relative to the lower frame element 107. In an example, an electrically powered lead screw is utilised to effect movement of the upper frame element 108 away from and towards the lower frame element 107.

Any suitable arrangement may be utilised to enable the tool support element 110 to be moved with respect to the frame structure 102 in the third direction 106. According to the illustrated example, the tool support element 110 is slidably engaged with the frame structure 102.

Thus, when the apparatus 101 is set up for use, the tool support element 110 can travel along the frame structure 102 in the X-direction 104, the frame structure 102 can travel along the base element 103 in the Y-direction 105, and the upper frame element 108 of the frame structure 102 can be opened and closed relative to the lower frame element 107, in the Z-direction 106.

Further, when the apparatus 101 is set up for use and a workpiece is held by the frame structure, the tool support element 110 can travel along the frame structure 102 in the X-direction 104, the frame structure 102 can travel along the base element 103 and simultaneously along the workpiece in the Y-direction 105, and the upper frame element 108 of the frame structure 102 can be opened and closed relative to the lower frame element 107, in the Z-direction 106.

The upper frame element 108 is movable relative to the lower frame element 107 to increase the extent of separation therebetween, to facilitate the insertion and removal of a workpiece therebetween, and is upper frame element 108 is movable relative to the lower frame element 107 to decrease the extent of separation therebetween to clamp a workpiece therebetween. The upper frame element 108 is thus movable relative to the lower frame element 107 to allow selective restraining and releasing of a workpiece from the frame structure 102.

Figure 2:
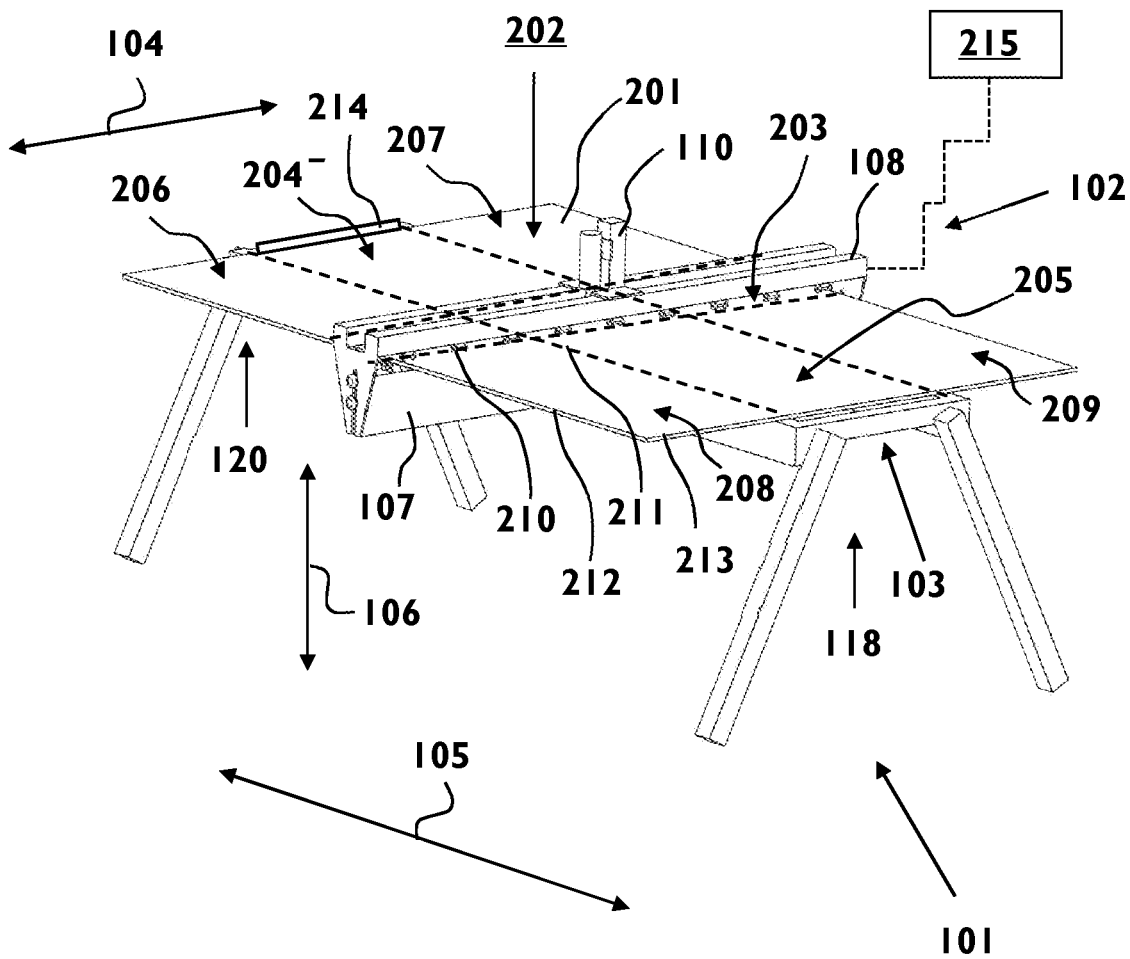
FIG. 2 shows the apparatus of FIG. 1, supporting a workpiece.

FIG. 2 shows apparatus 101 of FIG. 1 supporting a workpiece 201. As shown, the workpiece is a substantially planar sheet of material.

In use, the frame structure 102 travels along the workpiece 201 to position a tool supported by the tool support element 110 in the Y-axis direction 105 and the tool support element 110 travels along the frame structure 102 to position a tool supported by the tool support element 110 in the X-axis direction 104. The tool support element 110 allows the position of the tool to be adjusted in the Z-axis direction 106.

The frame structure 102 is arranged to maintain a pressure applied between the frame structure 102 and the workpiece 201. More specifically, in this example, the pressure is maintained between the upper frame element 108 and the upper surface 202 of the workpiece 201. However, that is not to say that pressure may not also be maintained between the lower frame element 107 and the opposite surface of the workpiece 201. Maintaining a pressure applied between the frame structure 102 and the workpiece 201 advantageously ensures proper alignment between a tool (not shown) supported by the tool support element 110. In addition, it ensures that the workpiece 201 is sufficiently restrained by the frame structure.

It is to be appreciated that the workpiece 201 may deviate from a planar configuration, and that different workpieces may deviate from a planar configuration in different ways. The pressure applied between the frame structure 102 and the workpiece 201 functions to overcome any such divergence from a planar configuration, in the region of travel of the tool support element 110. The applied pressure serves to compensate from any original deviation or subsequent warping of the workpiece 201, to maintain alignment of a tool supported by the tool support element 110 and the upper surface 202 of the workpiece 201. This arrangement beneficially provides the required alignment between the tool and the upper surface 202 of the workpiece 201 without requiring the entirety of the workpiece 201 to be held flat.

It is further to be appreciated that the pressure applied between the frame structure 102 and the workpiece 201 may result in a change of profile in one or both of the frame structure 102 and the workpiece 201 to achieve conformity with a desired configuration to maintain a desired relationship between a tool supported by the tool support element 110 and the workpiece 201.

Apparatus 101 is suitable for holding workpieces of different materials, for example workpieces comprising wood, plywood or a plastics material. In an example, the apparatus 101 is arranged to support a workpiece having dimensions of up to 2.4 m (or 8 feet) long, up to 1.2 m (or 4 feet) wide, and up to 110 mm (or 4½ inches) deep.

As shown, apparatus 101 can advantageously support a workpiece 201 that has a dimension in the Y-axis direction 105 that is greater than the dimension of the base element 103 in the X-axis direction 104.

As indicated previously, the arrangement of the apparatus 101 is such that there is no requirement to securely hold the entirety of the workpiece 201 flat during machining.

The workpiece 201 extends between the lower frame element 107 and the upper frame elements 107, 108 of frame structure 102. A strip 203 of the workpiece 201 is clamped within the frame structure 102, regions 204 and 205 rest on the base element 103, and regions 206, 207, 208 and 209 have a pair of inner, supported edges, such as edges 210 and 211 of region 208, and a pair of outer, unsupported edges, such as edges 212 and 213 of region 208.

As previously mentioned, the frame structure 102 is configured to travel along the workpiece 201; as the frame structure 102 moves in the second (Y-axis), direction 105 relative to the workpiece 201, the location of the clamped strip of the workpiece 201 in the second (Y-axis) direction 105 changes correspondingly. In other words, although the size of the area of the workpiece 201 that is restrained within the frame structure 102 may not alter, the distance of that area from a reference end of the workpiece 201 alters as the frame structure 102 moves along the workpiece 201 in the second (Y-axis) direction 105.

In a preferred example, the base element 103 comprises at least one stop element 214 against which an end of a workpiece can abut. In the shown arrangement, a stop element 214 is provided at the second end 120 of the base element 103. A workpiece can be inserted, from the first end 118, through the lower and upper frame elements 107, 108 of the frame structure 102 and up against the stop element 214.

It is to be appreciated that travel of the frame structure 102 along the base element 103, travel of the tool support element 110 along the frame structure 102, and operation of a tool supported by the tool support element 110, is effected under the control of one or more programmable logic controllers, such as a computer 215, using any suitable arrangement of motorised componentry and electronic circuitry.

Referring again to FIG. 1, in the specific example illustrated, the base element 103 comprises a pair of guide rails 114, 115, the pair of guide rails 114, 115 extending in the Y-axis direction 105 and spaced apart in the X-axis direction 104 in a substantially parallel arrangement. The base element 103 further comprises at least one connecting rail, such as connecting rail 116, extending in the X-axis direction 104 and connecting between the pair of guide rails 114, 115.

The base element 103 beneficially presents a non-solid support plane for a workpiece. This advantageously reduces the weight of the base element 103, which contributes to the portability of the apparatus 101.

It is to be appreciated that overlay or infill panels (not shown) may be provided for use with the base element 103 to convert the non-solid support plane to a solid support plane.

Further, in an alternative example, a base element is provided that is configured to present a solid support plane.

The apparatus 101 may be elevated above a support surface, such as a floor, by any suitable stand arrangement.

The apparatus 101 is shown in FIG. 1 with a first stand arrangement, which comprises a first base element support 117 for supporting a first end 118 of the base element 103 and a second base element support 119 for supporting a second end 120 of the base element 103. The first and second base element supports 117, 119 are usable to support the base element 103 in a substantially horizontal orientation relative to a horizontal support surface on which the first and second base element supports 117, 119 are standing.

Each of the first and second base element supports 117, 119 may take any suitable form. Each of the first and second base element supports 117, 119 may comprise one or more components, which may be connected or separate to one another. For example, each the first and second base element supports 117, 119 may comprise a pair of independent legs 121, 122 and 123, 124.

In the example shown in FIG. 1, the first and second base element supports 117, 119 are substantially the same.

Figure 3:
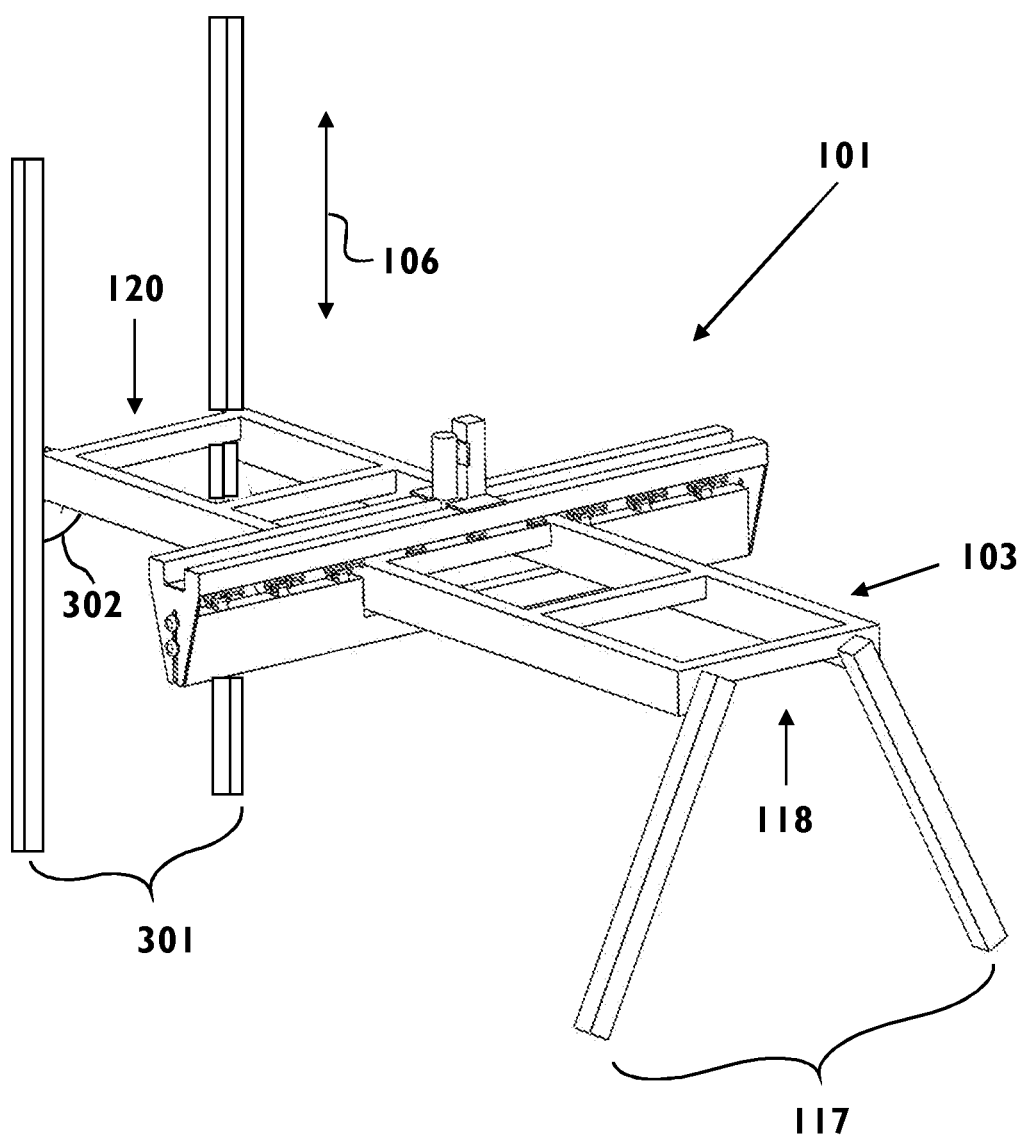
FIG. 3 shows apparatus of FIG. 1 for supporting a workpiece, and a second stand arrangement.

The apparatus 101 is shown in FIG. 3 with a second stand arrangement, which comprises first base element support 117 for supporting the first end 118 of the base element 103 and a third, alternative base element support 301 for supporting the second end 120 of the base element 103.

The second end 120 of the base element 103 is securable in each of a plurality of different positions along the third base element support 301, each of the plurality of different positions associated with a different angle of inclination of the base element 103 when the first and second ends 118, 120 thereof are supported by the first and third base element supports 117, 301. The third base element support 301 may present a plurality of discrete positions or, alternatively or additionally, may present a continuous range of positions. The third base element support 301 allows an angle 302 that the base element 103 extends therefrom to be adjusted.

According to the shown arrangement, the adjustment is performed by moving the second end 120 of the base element along the third base element support 301 in the third, Z-axis direction 106.

In an example, the base element 103 can be supported at an angle between 0 degrees (horizontal) and 90 degrees using the first and third base support elements 117, 301.

The apparatus 101 may be used with a third stand arrangement that comprises only the third, alternative base element support 301 for supporting one of the first and second ends 118, 120 of the base element 103; the other of the first and second ends 118, 120 of the base element 103 may rest on the floor or a mat. The third, alternative base element support 301 may be secured to a wall.

Any suitable arrangement may be utilised to enable the second end 118 of the base element 103 to be releasably secured in an available position along the third base element support 301. In an example, the base element 103 is slidable between each of a plurality of different positions along the third base element support 301.

Figure 4:
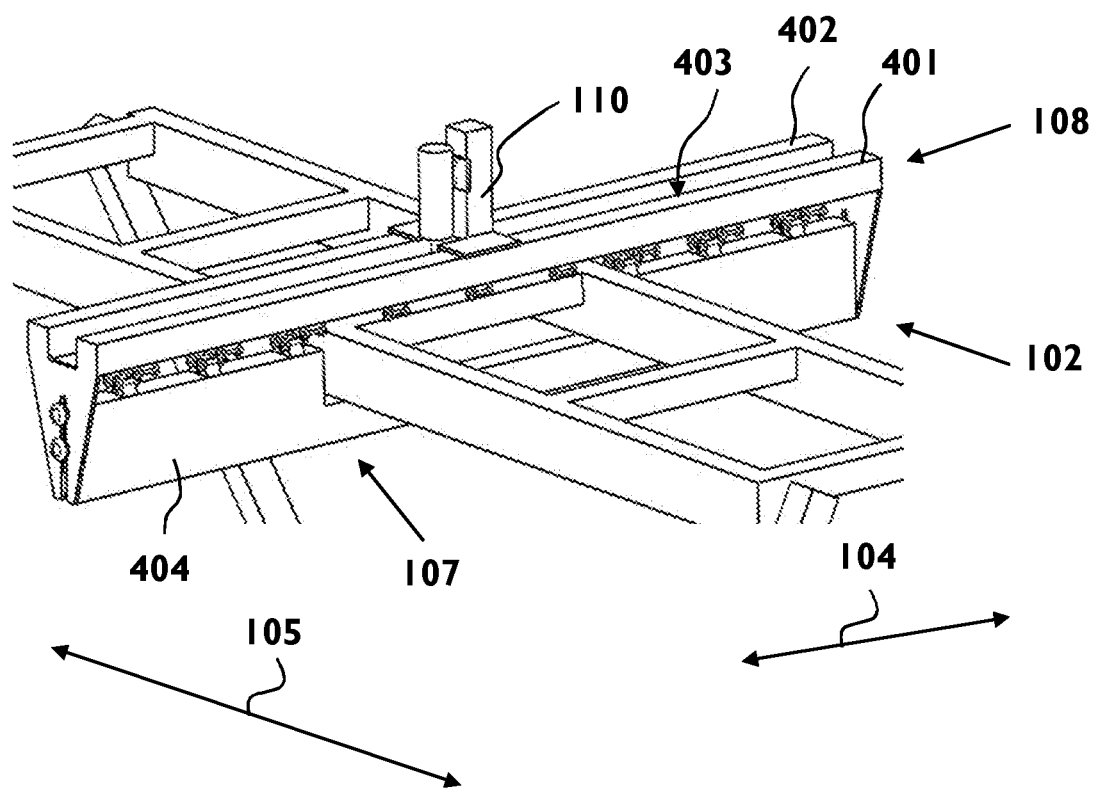
FIG. 4 shows features of the apparatus of FIG. 1 in further detail.

Referring to FIG. 4, in this example, the upper frame element 108 comprises a pair of upper guide bars 401, 402. The pair of upper guide bars 401, 402 extend in the first, X-axis direction 104 and are spaced apart in the second, Y-axis direction 105. The pair of upper guide bars 401, 402 define a window, indicated by arrow 403. The tool support element 110 is configured to support a tool (not shown), such as a router, at a position disposed, in the first direction 104, between the pair of upper guide bars 401, 402 for performing an operation on an upper surface of a workpiece held by the frame structure 102 and accessible through the window 403.

The lower frame element 107 comprises a lower guide bar 404. The lower guide bar 404 extends in the first, X-axis direction 104 and is disposed, in the first direction 104, between the pair of upper guide bars 401, 402.

Thus, the workpiece can be held by the frame structure with three contact regions being provided between the workpiece and the frame structure, first and second of the regions being between the upper frame element and a first, upper surface of the workpiece and a third of the regions between the lower frame element and a second, lower surface of the workpiece. It is to be appreciated that actual contact may be present at one or more locations within a contact region.

Figure 5:
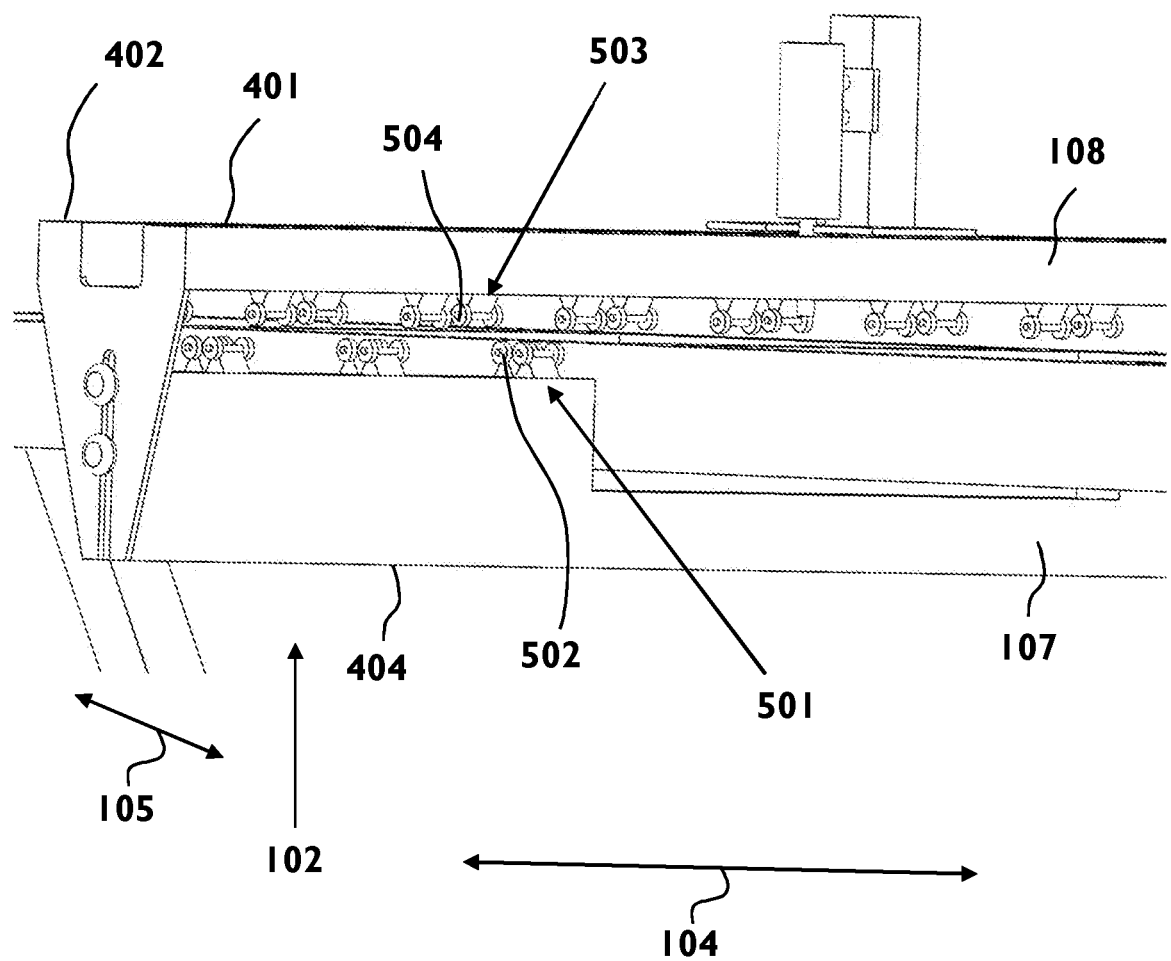
FIG. 5 shows the frame structure of the apparatus of FIG. 1 in further detail, with no workpiece received therein.

FIG. 5 shows a feature of the frame structure 102 of the apparatus 101 in further detail.

Preferably, the lower frame element 107 supports a lower bearing arrangement 501 comprising at least one bearing 502 for contacting the underside (lower surface) of a workpiece received between the lower frame element 107 and the upper frame element 108.

In this specific illustrated example, the lower guide bar 404 of the lower frame element 107 supports the lower bearing arrangement 501.

In the shown example, the lower bearing arrangement 501 comprises a plurality of bearings 502. According to the present example, the lower bearing arrangement 501 comprises a distribution of a plurality of bearings 502 that extends across substantially the entire length of the lower frame element 107 in the first direction 104. The lower bearing arrangement 501 may comprise pairs or sets of bearings 502, which are spaced apart, in any suitable pattern, along the length of the lower frame element 107 in the first direction 104.

The lower bearing arrangement 501 functions to assist smooth relative travel between the frame structure 102 and a workpiece received between the lower and upper frame elements 107, 108 thereof.

In a preferred example, the upper frame element 108 supports an upper bearing arrangement 503 comprising at least one bearing 504 for contacting the upper surface of a workpiece received between the lower frame element 107 and the upper frame element 108. In the shown example, the upper bearing arrangement 503 comprises a plurality of bearings 504.

In this specific illustrated example, each of the upper guide bars 401, 402 of the upper frame element 108 supports a portion of the upper bearing arrangement 503.

Preferably, the upper bearing arrangement 503 comprises a distribution of a plurality of bearing 504 that extends across substantially the entire length of the upper frame element 108 in the first direction 104. The upper bearing arrangement 503 may comprise pairs or sets of bearings 504, which are spaced apart, in any suitable pattern, along the length of the upper frame element 108 in the first direction 104.

The upper bearing arrangement 503 functions to assist smooth relative travel between the frame structure 102 and a workpiece received between the lower and upper frame elements 107, 108 thereof. It is to be understood also that, with the shown arrangement, one or more bearings 504 of the upper bearing arrangement 503 may contact the base element 103 when a workpiece is not present between the upper frame element 108 and the base element 103.

Figure 6:
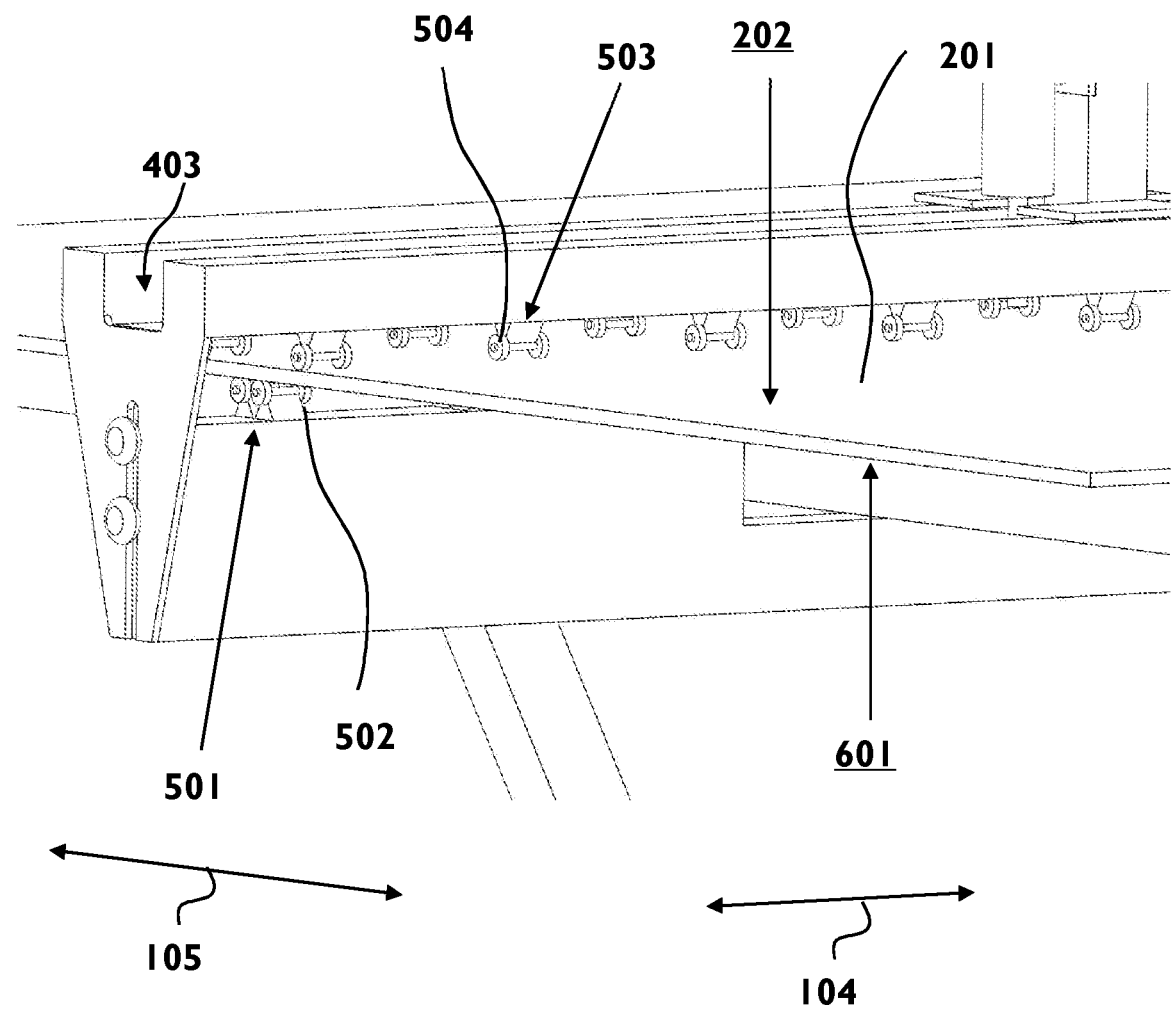
FIG. 6 shows the frame structure of the apparatus of FIG. 1 in further detail, with a workpiece received therein.

As illustrated in FIG. 6, which shows a workpiece 201 received by the frame structure 102, the bearings 502, 504 of the lower and upper bearing arrangements 501 503 of the specific illustrated example are staggered, or offset, along the length of the frame structure 102 in the first direction 104. More specifically, bearings 502 contacting the lower surface 601 of the workpiece 201 are disposed, in the first direction, between bearing 504 contacting the upper surface 202 of the workpiece 201.

This feature functions to assist in maintaining a region of a workpiece 201 received the lower and upper frame elements 107, 108 that is accessible through the window 403 in in a substantially flat condition, which in turn serves to improve the quality of machining. The bearings 502, 504 of the lower bearing arrangement 501 and the upper bearing arrangement 503 may also be staggered, or offset, along the length of the frame structure 102 in the second direction 105, as shown. This feature also functions to assist in maintaining a region of a workpiece 201 received the lower and upper frame elements 107, 108 that is accessible through the window 403 in a substantially flat condition, which in turn serves to improve the quality of machining.

In this specific example, the bearings 502 of the lower bearing arrangement 501 are rollers, which are arranged to rotate around an axis of rotation that extends in the first direction 104. Similarly, in this specific example, the bearings 504 of the upper bearing arrangement 502 are rollers, which are arranged to rotate around an axis of rotation that extends in the first direction 104.

It is to be appreciated that the term 'bearing' as used herein includes any device suitable for providing a low friction interface, for example a roller, a wheel, a skid, a pad, an air bearing or the like. A plurality of bearings of a lower bearing arrangement or an upper bearing arrangement may include any number of bearing in any suitable arrangement. A plurality of bearings of a lower bearing arrangement or an upper bearing arrangement may include bearings of all the same type of bearing or different types and may comprise bearings of the same size or different sizes. As indicated previously, the lower bearing arrangement, and similarly the upper bearing arrangement, may comprise only a single bearing.

The apparatus 101 advantageously overcomes the requirement for a cumbersome work bed, as found in the prior art.

The apparatus may include any desired safety features.

The apparatus may comprise any suitable material or combination of materials. In an example, the base element may comprise a metal material. In an example, the upper and lower frame elements of the frame structure may comprise a metal material. The tool support element may comprise a metal material. The or each base element support of a stand arrangement may comprise a metal material. The or each physical bearing of a lower bearing arrangement or upper bearing arrangement may comprise a plastics material. The plastics material may be polytetrafluoroethylene (PTFE). The selection of materials preferably balances characteristics of strength and weight to ensure sufficient rigidity and portability. The apparatus may comprise aluminium.

The apparatus 101 is usable in any suitable location, for example a workshop or a garage. In a preferred example, the apparatus 101 is configured to be transported in a van or other vehicle typically used by tradespersons. Preferably, the frame structure 102 is removable from the base element 103 to facilitate transportation and storage of the apparatus 101. In addition, a stand arrangement is either releasably connectable to the base element 103 or is configured to be folded between erect and collapsed configurations, to similarly facilitate transportation and storage of the apparatus 101.

Although illustrative embodiments of the invention have been disclosed in detail herein, with reference to the accompanying drawings, it is to be understood that the invention is not limited to the precise embodiments and examples shown and that various changes and modifications can be effected therein by one skilled in the art without departing from the scope of the invention as defined by the appended claims.

The invention claimed is:

1. Apparatus for supporting a workpiece that is a substantially planar sheet of material, comprising:
a frame structure for holding a workpiece, the frame structure having a length dimension in a first direction (X-axis), a width dimension in a second direction (Y-axis) and a depth dimension in a third direction (Z-axis), and
a base element for supporting the frame structure;
the frame structure movable with respect to the base element in the second direction (Y-axis),
the frame structure comprising a lower frame element and an upper frame element, between which a workpiece is receivable,
the upper frame element movable with respect to the lower frame element in the third direction (Z-axis), to adjust the distance between the upper frame element and the lower frame element, for clamping a workpiece therebetween;
the frame structure movable with respect to a workpiece held between the lower frame element and the upper frame element in the second direction (Y-axis), whereby the frame structure in use travels along the workpiece in the second direction (Y-axis).

2. Apparatus as claimed in claim 1, further comprising a tool support element for holding a tool, the tool support element movable with respect to the upper frame element in the first direction (X-axis).

3. Apparatus as claimed in claim 2, wherein said upper frame element comprises a pair of upper guide bars, the pair of upper guide bars extending in said first direction (X-axis) and spaced apart in said second direction (Y-axis) and the pair of upper guide bars defining a window, said tool support element configured to support a tool at a position disposed, in the second direction (Y-axis), between the pair of upper guide bars for performing an operation on a surface of a workpiece held by the frame structure and accessible through said window.

4. Apparatus as claimed in claim 3, wherein said lower frame element comprises a lower guide bar extending in said first direction (X-axis) and disposed, in said second direction (Y-axis), between said pair of upper guide bars.

5. Apparatus as claimed in claim 1, wherein the lower frame element defines a recess therein, and the base element is receivable between the lower frame element and the upper frame element and within the recess.

6. Apparatus as claimed in claim 5, wherein the base element is removably receivable between the lower frame element and the upper frame element and within the recess.

7. Apparatus as claimed in claim 1, wherein the base element comprises a pair of guide rails, the pair of guide rails extending in said second direction (Y-axis) and spaced apart in said first direction (X-axis), in a substantially parallel arrangement, said frame structure slidable along said pair of guide rails.

8. Apparatus as claimed in claim 1, wherein said lower frame element supports a lower bearing arrangement comprising at least one bearing for contacting the lower surface of a workpiece received between the lower frame element and the upper frame element, for facilitating travel of the frame structure along a workpiece held between the lower frame element and the upper frame element.

9. Apparatus as claimed in claim 8, wherein said lower bearing arrangement comprises a plurality of bearings.

10. Apparatus as claimed in claim 8, comprising at least one bearing that comprises one of: a roller, a wheel, a skid, a pad, an air bearing.

11. Apparatus as claimed in claim 8, wherein said upper frame element supports an upper bearing arrangement comprising at least one bearing for contacting the upper surface of a workpiece received between the lower frame element and the upper frame element, for facilitating travel of the frame structure along a workpiece held between the lower frame element and the upper frame element.

12. Apparatus as claimed in claim 1, wherein said upper frame element supports an upper bearing arrangement comprising at least one bearing for contacting the upper surface of a workpiece received between the lower frame element and the upper frame element, for facilitating travel of the frame structure along a workpiece held between the lower frame element and the upper frame element.

13. Apparatus as claimed in claim 12, wherein said upper bearing arrangement comprises a plurality of bearings.

14. Apparatus as claimed in claim 12, comprising at least one bearing that comprises one of: a roller, a wheel, a skid, a pad, an air bearing.

15. Apparatus as claimed in claim 1 further comprising a first base element support for supporting a first end of the base element and a second base element support for supporting a second end of the base element.

16. Apparatus as claimed in claim 15, wherein one of the first and second ends of the base element is securable in each of a plurality of different positions along one of the first and second base element supports, each of said plurality of different positions associated with a different angle of inclination of said base element when the first and second ends thereof are supported by the first and second base element supports.

17. Apparatus as claimed in claim 16, wherein said one of the first and second ends of the base element is slidable between each of a plurality of different positions along said one of the first and second base element supports.

18. Apparatus as claimed in claim 1, wherein the frame structure is elongate, having a length dimension in the first direction (X-axis) that is greater than the width dimension in the second direction (Y-axis) and that is greater than the depth dimension in the third direction (Z-axis).

19. A CNC machine comprising apparatus as claimed in claim 1.

20. A CNC machine as claimed in claim 19, wherein said CNC machine is a CNC router.

* * * * *